United States Patent

Suzuki et al.

Patent Number: 6,078,457
Date of Patent: Jun. 20, 2000

[54] DRIVING METHOD FOR A STEPPING MOTOR

[75] Inventors: Yuzuru Suzuki; Sakae Fujitani; Yoshiyuki Aono; Masahisa Ezuka, all of Iwata-gun, Japan

[73] Assignee: Minebea Co., Ltd., Kitasaku, Japan

[21] Appl. No.: 08/879,025

[22] Filed: Jun. 19, 1997

[30] Foreign Application Priority Data

Jul. 22, 1996 [JP] Japan .................................. 8-210594

[51] Int. Cl.$^7$ .................................................. G11B 19/20

[52] U.S. Cl. ........................................ 360/73.03; 318/696

[58] Field of Search ...................... 360/73.03, 71; 318/696, 711, 685

[56] References Cited

U.S. PATENT DOCUMENTS

| | | | |
|---|---|---|---|
| 4,882,530 | 11/1989 | Kabune et al. | 318/696 |
| 5,235,264 | 8/1993 | Kaneda et al. | 360/73.03 X |
| 5,262,709 | 11/1993 | Yasuda | 318/696 |
| 5,485,070 | 1/1996 | Tominaga | 318/696 |

FOREIGN PATENT DOCUMENTS 6-290535  10/1994  Japan .

Primary Examiner—Aristotelis M. Psitos
Assistant Examiner—James L Habermehl
Attorney, Agent, or Firm—Staas & Halsey, L.L.P.

[57] ABSTRACT

A method for driving a recording disc applies a DC excitation hold so that a rotor portion is stopped. Thereafter, a DC excitation frequency is gradually increased from a low frequency to a rated frequency and synchronizes with the rated revolution.

8 Claims, 8 Drawing Sheets

Fig. 7 note) a positive relative speed corresponds to a direction of revolution, a negative one to reverse direction. A numeral zero corresponds to a motionless state.

Fig. 8

Fig. 9(a)
a stopped position of a rotor being closer to an excited-stability point

Fig. 9(b)
a stopped position of a rotor being apart from an excited-stability point ion recording apparatus, especially a floppy disk drive has an extremely great frictional (load) torque because the magnetic head is always in contact with the recording medium and the value of the torque greatly varies depending on the track position on which the head is placed and the environmental conditions of the contact portion. In a 3.5-inch FDD, for example, the value varies from 1.0 to 10.0 (mN·m).

DRIVING METHOD FOR A STEPPING MOTOR

BACKGROUND OF THE INVENTION

1. Field of the Invention

The present invention relates generally to a recording disk driving system in an information recording apparatus rotating a recording medium in a disk form at a constant speed and accessing the recording disk for information and, more particularly, to a recording disk driving system in an information recording apparatus using a stepping motor as the drive source for directly driving a recording medium.

2. Description of the Prior Art

For writing information into and reading information from a disk-formed information recording medium used in a word processor or a personal computer, called a floppy disk, a floppy disk drive (FDD) is used. In the FDD, a brushless DC motor has so far been used as the spindle motor for rotatably driving the floppy disk. Although there are no problems with the brushless DC motor as to its characteristics and reliability, it requires position detectors and a speed detector for its rotor. Therefore, the cost of the motor and driving device becomes high. More specifically, in order to ensure accuracy in the rotation, a servo control with speed feedback technique becomes necessary in the driving and this causes the circuit configuration to become larger in scale. Thus, it has become impossible for the system to meet the recent requirements for cost reduction.

Under these circumstances, studies have so far been made on the stepping motor as to its use for the spindle motor for driving the recording medium. Since the stepping motor operates stepwise by the nature of its configuration, in order to rotate it smoothly while keeping accuracy in rotation of the recording disk, such a method has been used as to increase the moment of inertial of the rotating portion and improve the rotational operation by means of the flywheel effect. However, as a natural consequence of the increase in the moment of inertia, it has become difficult to cause the recording disk to self-start and hence provision of a dedicated circuit for starting the recording disk has come to be needed.

The starting circuit for the stepping motor is generally called a ramp circuit or throw-up circuit (hereinafter called a ramp circuit) and it functions so as to excite the motor with a very low frequency at the beginning of the starting and then increase the exciting frequency gradually until it becomes synchronized with the rated revolution. In the case of a stepping motor provided with no rotor position detector, a starting system best suited to the load characteristic of the apparatus becomes necessary to ensure reliable starting and obtain a short revolution settling time.

The term "revolution settling time" in the present invention means the time period from when the recording disk in its stopped state is started up to when the recording disk then accelerated acquires such an average number of revolutions, accompanied by accuracy in the rotation, that allows access to information. When referring not to the time itself required for settling the revolution but the general rise in the number of revolutions, the term "starting characteristic" is used.

An information recording apparatus, especially a floppy disk drive has an extremely great frictional (load) torque because the magnetic head is always in contact with the recording medium and the value of the torque greatly varies depending on the track position on which the head is placed and the environmental conditions of the contact portion. In a 3.5-inch FDD, for example, the value varies from 1.0 to 10.0 (mN·m).

In the worst case, it sometimes occurs that the head sticks to the medium.

In the case of a stepping motor provided with no rotor position detector, even if equal starting current is supplied, the generated torque greatly varies depending on the magnetic relative position between the rotor and the stator at the time of start-up. This not only causes fluctuation in the revolution settling time (unstable state) but also causes, when the torque margin is not sufficient, disk trouble, even if a ramp circuit is used, being still unable to self-start (failure of start-up).

Therefore, when a stepping motor is used for driving the recording disk in an information recording apparatus, it becomes necessary to provide a driving system ensuring stable starting and having high reliability even under the conditions of a widely varying load and an extremely great moment of inertia of the recording disk.

SUMMARY OF THE INVENTION

As described above, the stepping motor can be simply driven by means of economical digital circuit technology. However, in order to achieve its smooth rotation and secure accuracy in its revolution, it is required that the moment of inertia of the rotating portion be increased and, as the natural consequence of the increase in the moment of inertia, a fatal problem arises that it becomes impossible to make the recording disk self-start. The present invention has been made under these situations. Accordingly, it is an object of the invention to provide a driving system capable of obtaining a short and stable revolution settling time of the recording disk even on such occasions that the recording disk is otherwise unable to self-start at all, or if it can self-start, it does not operate in a stable manner under various operating conditions and falls short of torque margin. Another object of the invention is to provide a driving system which does not cause a failure of start-up even when there is a particularly heavy frictional load as with an FDD.

In the case of a stepping motor having no rotor position detector, even when it is started by the use of a ramp circuit, the torque generated thereby greatly varies even though the same starting current is supplied thereto, depending on the magnetic relative position between the rotor and the stator at the moment when it is started, i.e., depending on the so-called $\Theta$–T characteristic. This not only produces fluctuation in the revolution settling time of the recording disk but also causes a failure of the recording disk in synchronizing with the rated revolution (failure of start-up) in the worst case.

In the present invention, whatever position the recording disk may be stopped at, i.e., whatever magnetic positional relationship may exist between its rotor and stator, in the instant of start-up of the recording disk, the following procedures are carried out:

(1) DC excitation-hold is performed for a short period of time at the beginning of starting; then, the rotor, whatever position it may be located at, comes to be held at the excitation-hold point after making a damping oscillation. Then, (2) within a predetermined period of time, the exciting frequency is gradually increased from a very low frequency, less than half of the exciting frequency corresponding to the rated revolution to the frequency to be synchronized with the rated revolution. Or, (3) within a predetermined period of time, excitation at a very low frequency, less than half of the exciting frequency corresponding to the rated revolution, is continued for a certain period of time (low-speed excitation period), and, after a fixed number of revolutions is attained, the frequency is gradually increased up to the value to be synchronized with the rated revolution.

By providing a driving system of a recording disk for use in an information recording apparatus carrying out the procedure (2) or (3) of the above three items or providing a driving system of a recording disk for use in an information recording apparatus carrying out the procedures (1) and (2), or (1) and (3), and by driving the recording disk by such system, not only the failure of start-up can be avoided but also a short and stable revolution settling time can be secured.

BRIEF DESCRIPTION OF THE DRAWINGS

FIG. 9 (a) is a starting characteristic when the rotor I stopped very close to the excited-stability point and FIG. 9 (b) is a starting characteristic when the rotor is stopped far apart from the excited-stability point.

DESCRIPTION OF THE PREFERRED EMBODIMENTS

Figure 1A:
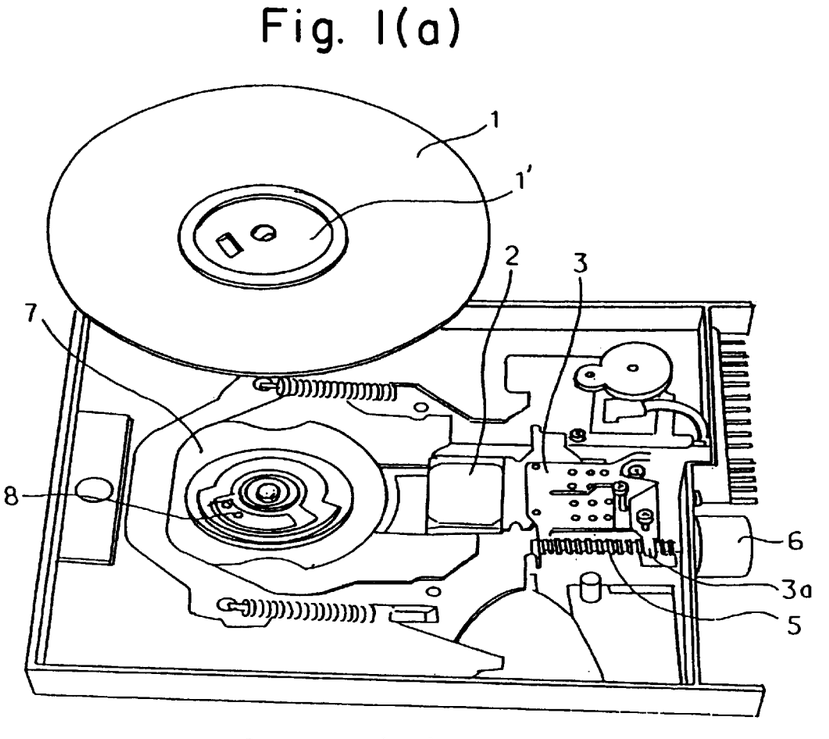
FIG. 1(a) shows a floppy disk drive with the recording disk removed and FIG. 1(b) shows the floppy disk drive with the recording disk mounted thereon.
Figure 1B:
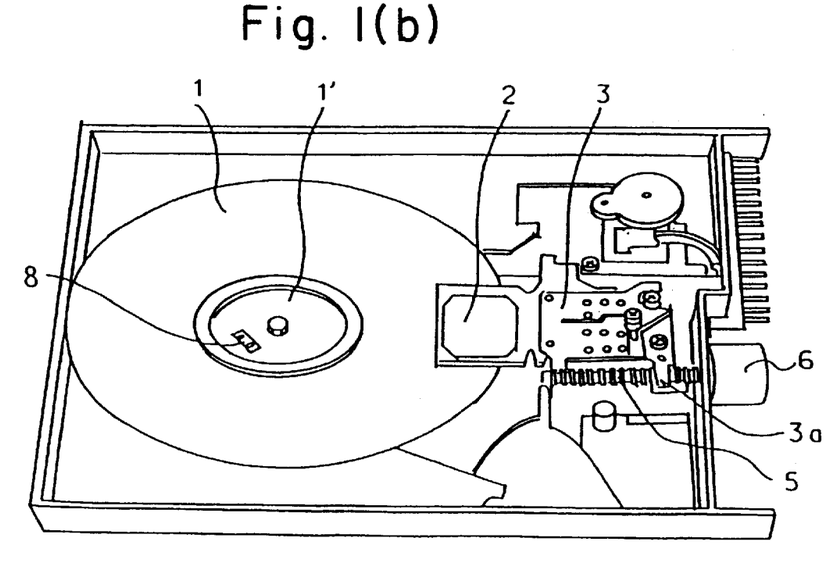

An embodiment of the invention will be described in detail with reference to the accompanying drawings. Description will be given taking a 3.5-inch FDD as an example of the information recording apparatus of the invention. FIG. 1(a) and FIG. 1(b) are partial views of a 3.5-inch FDD conceptually showing only its main portions necessary for description, of which FIG. 1(a) is a conceptual drawing showing the apparatus with the recording disk removed therefrom and FIG. 1(b) is a conceptual drawing showing the apparatus with the recording disk mounted thereon. Referring to FIG. 1, reference numeral 1 denotes a recording medium in a disk form (hereinafter called "recording disk") of which both surfaces are coated with magnetic fine grains. The recording disk 1 is provided with a chucking hub 1' fixedly fitted in its central portion, which chucking hub 1' is made of a ferrous material in a dish form and has two holes made therein. The recording disk 1 as a whole is contained in a plastic case (not shown) for protecting the surfaces of the recording medium and for the ease of carrying.

Reference numeral 2 denotes a magnetic head for accessing the recording disk 1 for information. Namely, the magnetic head 2, in its state in contact with the recording disk 1, reads out information recorded on the recording disk as magnetic changes of the magnetic grains. When information is written, the magnetic grains on the recording disk 1 are given magnetic changes. Namely, the magnetic head 2 functions both to read information written on the recording disk 1 and to write information on the same by means of coils incorporated therein.

Reference numeral 3 denotes a head carriage with the magnetic head 2 mounted thereon. The magnetic head 2 is provided at the end portion of the head carriage. The head carriage 3, formed of an actuator motor 6 and a screw 5 for converting its rotational motion into linear motion, is a mechanism for directly moving the magnetic head 2 to the right position (track) on the recording disk 1. In order to convert rotational motion into linear motion, the head carriage 3 is provided, at a portion thereof, with a nut portion 3a which is threadedly engaged with the groove in the screw 5. The head carriage 3 as a whole is adapted to make linear motion as the screw 5 rotates. Thus, by means of a position command given to the actuator motor 6 (the command is determined by the number of pulses given to the actuator motor 6) the magnetic head 2 can be properly moved to a desired track position on the recording disk 1.

Reference numeral 7 denotes a spindle motor for rotating the magnetic disk 1, for which a stepping motor is used in the present invention. At the end of the revolving shaft of the spindle motor 7, there is provided a chucking mechanism 8, which rotates the recording disk 1, while stably holding the chucking hub 1' of a ferrous material provided in the central portion of the recording disk 1 by magnetic force. As a result, the recording disk 1 is stably rotated while being clamped by the chucking mechanism 8 of the spindle motor 7.

Figure 2:
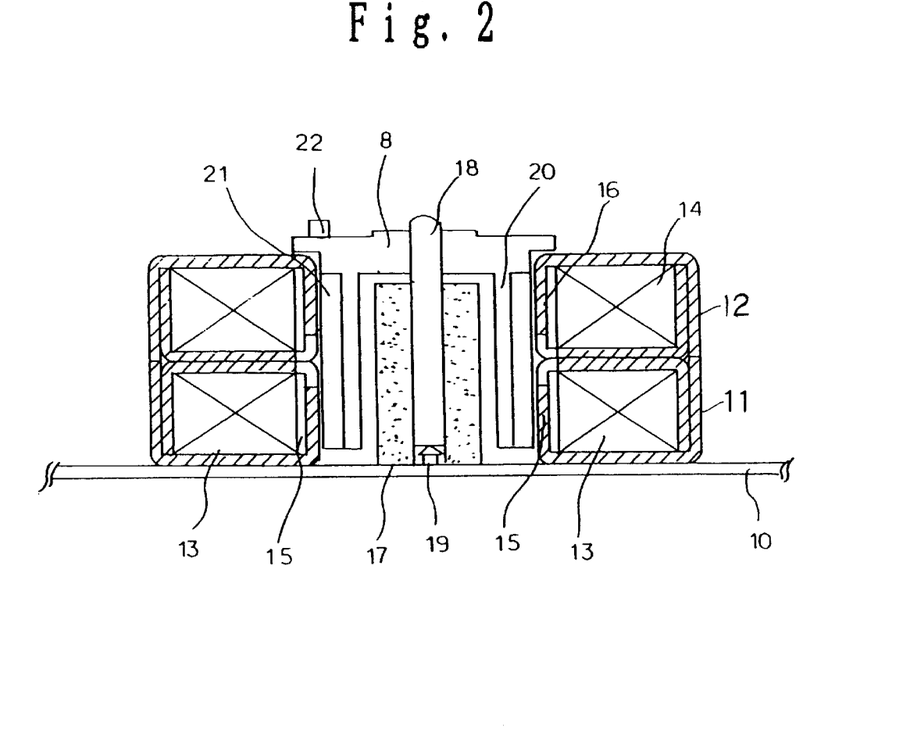
FIG. 2 is a sectional view of an inner rotor type spindle motor.

A stepping motor is used as the spindle motor 7 in the invention. FIG. 2 is a sectional view of an inner rotor type stepping motor as an example specifically showing a motor structure of a two-phase claw pole type having a merit that it is obtainable at low cost. Below will be described the structure of the stepping motor. As shown in FIG. 2, the stepping motor is installed on a bed plate 10. The stepping motor has two stator yokes 11 and 12 disposed on the bed plate 10 with one placed upon the other. Inside the stator yokes 11 and 12, there are provided stator coils 13 and 14, respectively. The central portion of the stator yokes 11 and 12 is made to have a cylindrical form and, on the side wall thereof, there are provided pole teeth 15 and 16. In the center of the cylindrical space formed within the stator yokes 11 and 12, there is disposed a bearing 17 upright on the bed plate 10. The revolving shaft 18 is rotatably supported on the bearing 17. The lower end of the revolving shaft 17 is rotatably supported by a thrust bearing 19 on the bed plate 10. To the upper end of the revolving shaft 18 is attached a rotor 20 in a cup form. The rotor 20 is provided with rotor magnets 21 fixedly disposed at its portions opposing the pole teeth 15 and 16. At the top portion of the rotor 20, i.e., at the bottom portion of the cup form, there is provided the chucking portion 8 for holding the chucking hub 1' of the recording disk 1 thereon. Reference numeral 22 denotes a pin to be fitted in the hole made in the hub of the magnetic disk 1.

Figure 3:
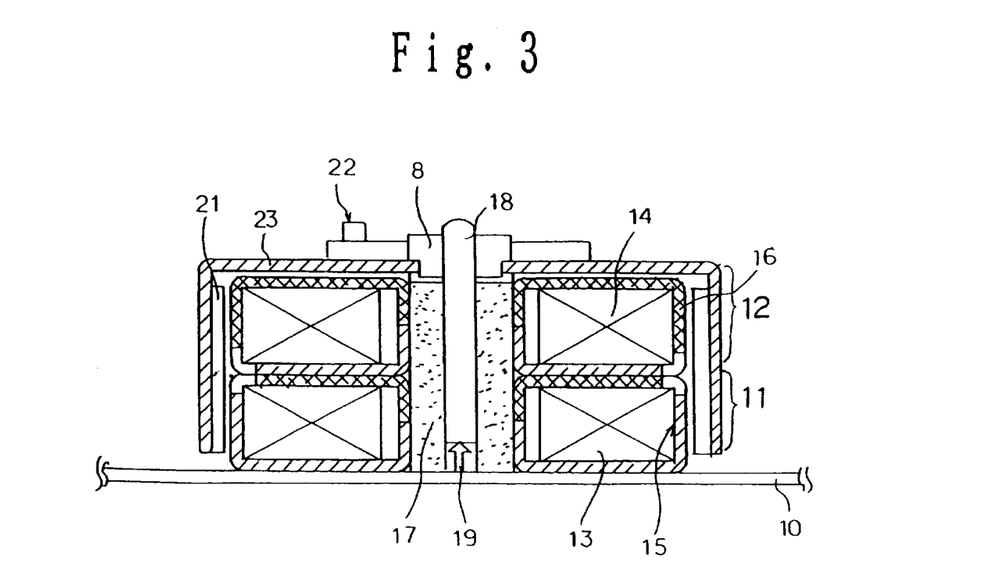
FIG. 3 is a sectional view of an outer rotor type spindle motor.

FIG. 3 is a sectional view of a stepping motor of an outer rotor type. Below will be described the structure of the stepping motor. The parts corresponding to those shown in FIG. 2 are denoted by like reference numerals and description of the same will be omitted except when it is necessary. Similarly to the arrangement shown in FIG. 2, the stepping motor is installed on the bed plate 10. The stepping motor has two stator yokes 11 and 12 disposed on the bed plate 10 with one placed upon the other. Inside the stator yokes 11 and 12, there are provided stator coils 13 and 14, respectively. The central portion of the stator yokes 11 and 12 is made to have a cylindrical form. In the interior of the cylindrical space, there is disposed a bearing 17 upright on the bed plate 10. The revolving shaft 18 is rotatably supported on the bearing 17 and the lower end of the revolving shaft 17 is rotatably supported by a thrust bearing 19 on the bed plate 10. On the outer side walls of the stator yokes 11 and 12, there are formed pole teeth 15 and 16. To the upper end of the revolving shaft 18 is attached a rotor 23 in a cup form. The rotor 23 is provided with rotor magnets 21 fixedly disposed at positions opposing the pole teeth 15 and 16. At the top portion of the rotor 23, i.e., at the bottom portion of the cup form, there is provided a chucking portion 8 for holding the chucking hub 1' of the recording disk 1 thereon. Reference numeral 22 denotes a pin to be fitted in the hole made in the hub of the magnetic disk 1. In the present invention, the stepping motor of either the inner rotor type or the outer rotor type is used.

When the stepping motor is used for driving the recording disk 1 at its rated number of revolutions (for accessing information), it can be driven in the same manner as in driving an ordinary stepping motor. Namely, it is driven by supplying the stator coils 13 and 14 of the stepping motor with an exciting signal at an exciting frequency to be determined by the number of revolutions, the number of steps, and the exciting mode. Application of such a signal is performed by switching the exciting signal supplied to the stator coils at suitable timing by means of transistors and the like so that a revolving magnetic field at a fixed speed is produced therein. However, when it is unable to cause the recording disk to self-start at the rated number of revolutions due to a large load (starting) torque or a large moment of inertia of the rotating portion, a circuit dedicated to starting up becomes necessary in addition to that for the driving at the rated number of revolutions.

In the present invention, such abnormalities can be prevented from occurring that the recording disk in its stopped state becomes unable to self-start at all, or even though it can self-start, it does not operate in a stable manner under various operating conditions (ranges of voltage, current, temperature, humidity, and the like) and falls short of torque margin. Further, a short and stable revolution settling time of the recording disk can be obtained. Even when there is a particularly heavy frictional load as with the FDD, the invention provides a driving system not causing any failure of start-up.

Figure 4:
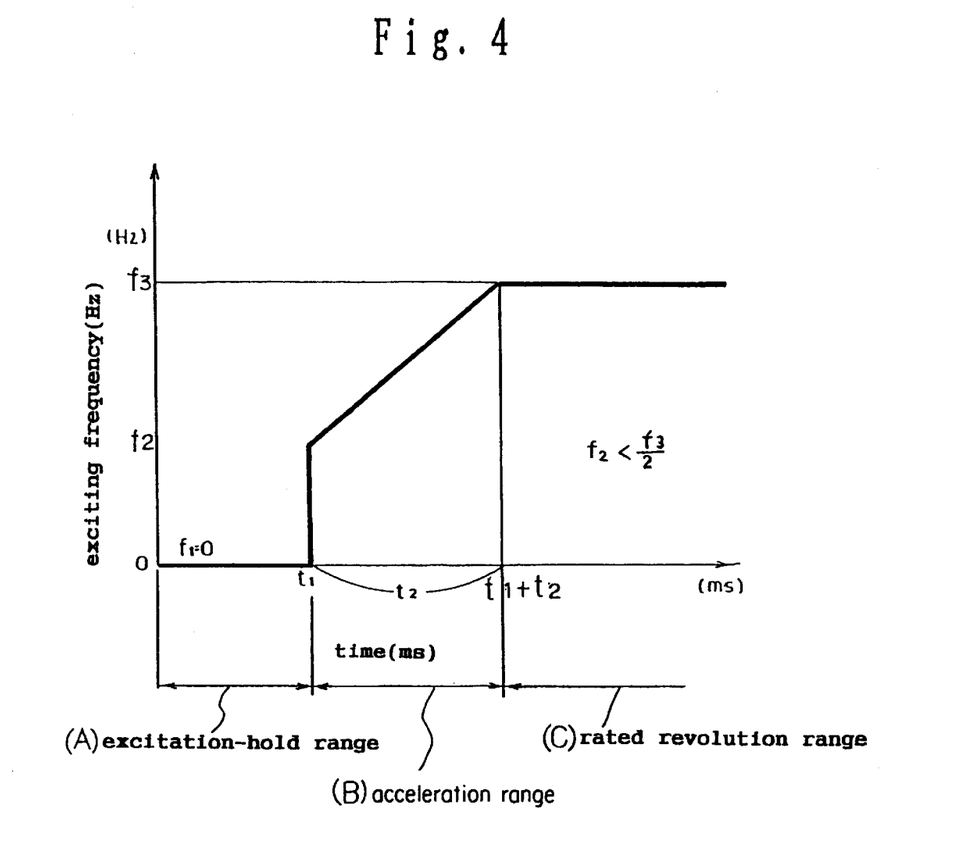
FIG. 4 is a first example of the starting pattern diagram when a stepping motor is started up.

FIG. 4 shows a first embodiment describing such a driving system of the invention, in which there is shown a diagram indicating the relationship between the exciting frequency of the stepping motor at its starting and time (hereinafter called "starting pattern"). The starting pattern consists of three ranges, i.e., (A) excitation-hold range, (B) acceleration range, and (C) rated revolution range. The period of time of the DC excitation-hold range is t1 and, in the following acceleration range which takes a period of time t2, the exciting frequency is gradually (linearly in the case shown) increased from f2 to f3 which is the exciting frequency corresponding to the rated number of revolutions, so that synchronism is attained in the rated revolution range at the exciting frequency f3.

Referring to FIG. 4, whatever positional relationship between the rotor and the stator may exist at the time of the starting up of the motor, the rotor is pulled into a state of excitation-hold where it is stopped (the relative speed between the rotor and the stator is zero) in the excitation-hold time t1 at the beginning of the starting. Then excitation is performed by gradually increasing the frequency from an extremely low frequency f2 so that a great and stable torque (with small fluctuations) is produced. Then, by properly setting up the gradient of the acceleration range $\{(f3-f2)/t2\}$ such that the rotor does not step out, after the rotor is started in motion by the first excitation at the acceleration range (exciting frequency is f2), it is assured that the recording disk is settled into its synchronized state with a stable torque applied thereto over the period from the start of motion of the recording disk to its reaching the rated number of revolutions. As a matter of course, the same effect can be obtained from the system of the invention even when the head is operated in a manner not contacting the recording medium or when the moment of inertia of the recording disk is extremely great.

Figure 5:
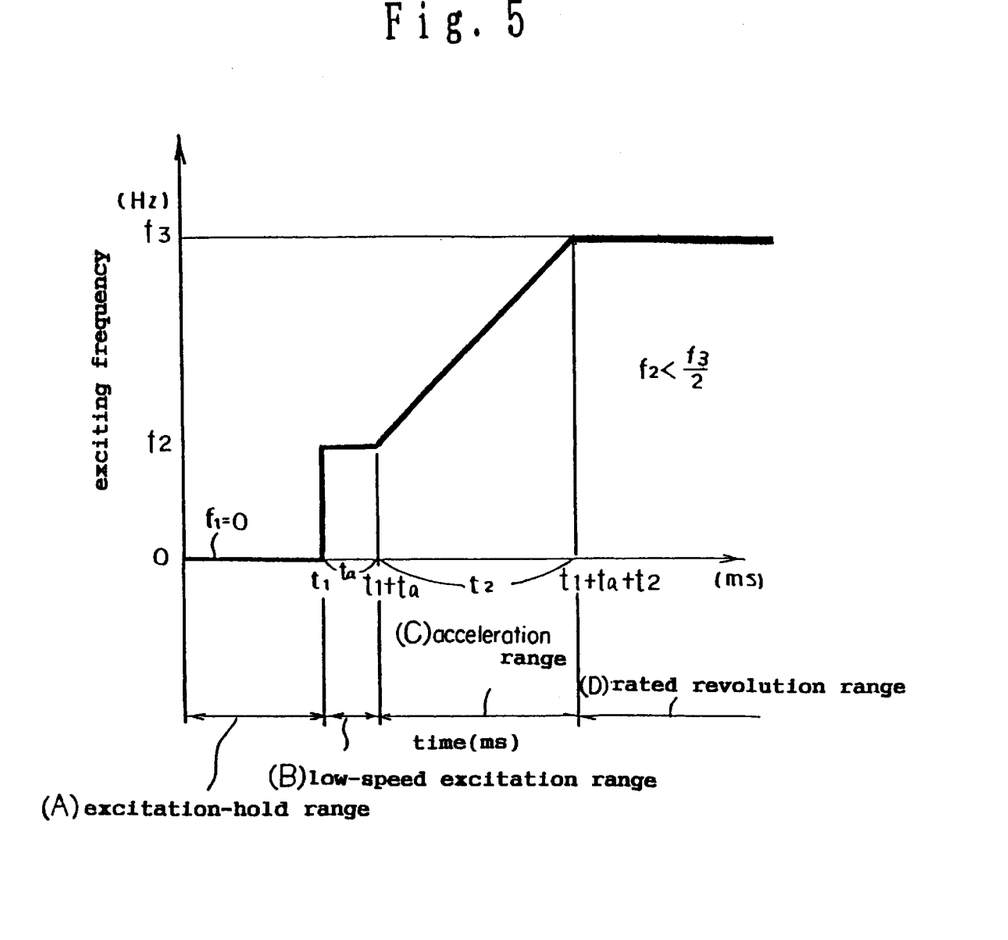
FIG. 5 is a second example of the starting pattern diagram when a stepping motor is started up.

A second embodiment of the invention is shown in FIG. 5. The second embodiment as shown in FIG. 5 consists of four ranges: (A) excitation-hold range, (B) low-speed excitation range, BE (C) acceleration range, and (D) rated revolution range. While the hold time in the DC excitation-hold range is t1, this embodiment is different in that excitation with the exciting frequency f2 is continued thereafter for a period of time ta, i.e., there is the so-called low-speed excitation range. The following acceleration range and the rated revolution range are the same as those in the first embodiment, i.e., the exciting frequency is gradually and continuously increased (linearly increased in the case shown) to the exciting frequency f3 so as to be synchronized with the rated number of revolutions f3.

First, in the DC excitation-hold time t1 at the beginning of the start-up, the relative magnetic position between the rotor and the stator is brought into an excitation-hold state (where the relative speed between the rotor and the stator is zero). This embodiment is like the first embodiment in that the related positions of the rotor and the stator are brought into agreement at a nearby excited-stability point, but it greatly differs therefrom in that the excitation with the constant exciting frequency f2 is then continued for the period of time ta, i.e., there is the so-called low-speed excitation range. By the provision of the low-speed excitation range, the recording disk which has just started to move is allowed to "get used to" (to be described below) the exciting frequency f2, though the degree of getting used to depends on the gradient in the following acceleration range (which gradient is generally set to be as great as the circumstances allow because it is desired to decrease the revolution settling time). As a result, the rotating condition of the rotor portion, including the recording disk before being accelerated, can be adjusted so that a revolution settling time that is more stabler (less fluctuated) than in the first embodiment can be obtained. Operations in the subsequent acceleration range and the rated revolution range of the recording disk 1 are completely the same as in the first embodiment.

The above expression "to get used to" means to allow the relative speed between the revolving magnetic field and the rotor to settle into a fixed state by continuing the excitation for the time of virtually one period or an integer multiple of the period of the characteristic oscillation to be determined by the state of excitation of the apparatus.

Although it is generally said that a stepping motor is running in synchronism with an exciting frequency (clock) applied thereto, if the speed is seen microscopically, portions where the speed is higher and where the speed is lower are alternating, i.e., acceleration and deceleration at the characteristic frequency are constantly repeating centering around the synchronous speed (the speed of the revolving magnetic field). Therefore, at the time corresponding to an integer multiple of one period of the characteristic oscillation, the revolving magnetic field and the rotor become equal in speed. Thus, the time of one period or an integer multiple of it from the excitation-hold in this invention is when the relative speed becomes completely zero.

Although, in the systems of the first and second embodiments, the exciting frequency in the acceleration range has been linearly accelerated from f2 to f3, it may be accelerated in an S-shaped manner. Especially, when it is desired to shorten the revolution settling time, it is effective to decrease the exciting frequency for some time before the motor enters the rated revolution range so as to suppress the variation in the number of revolutions arising at the boundary between the acceleration range and the rated revolution range and, then to synchronize it with the rated revolution. Thus, the invention is not limited to the system having a linear pattern in the acceleration range.

Figure 7:
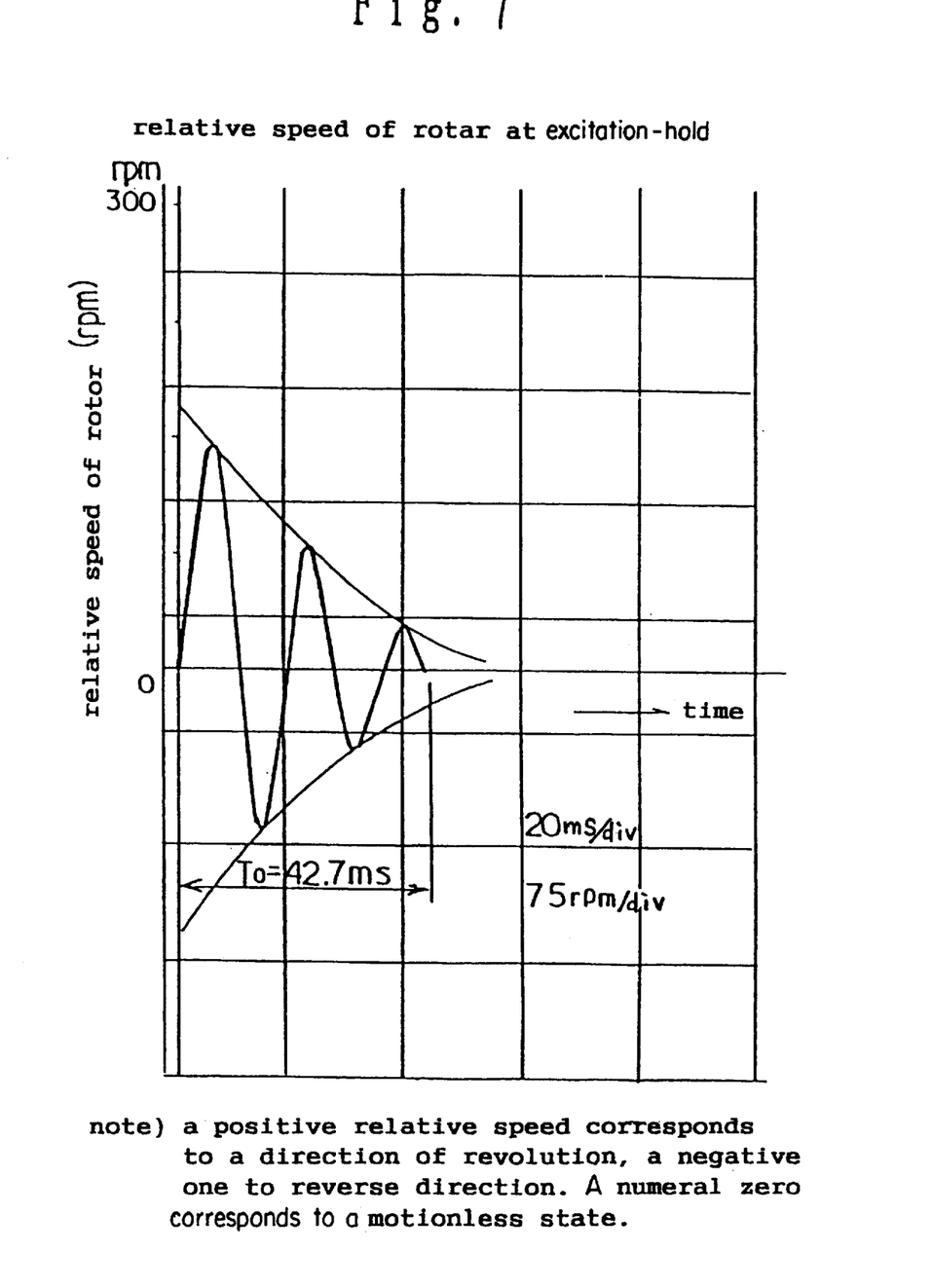
FIG. 7 is a relative speed diagram of the rotor portion in the DC excitation-hold time.

FIG. 7 shows a waveform chart showing changes in the relative speed of the rotor portion against time during the excitation-hold period when a stepping motor of an inner rotor two-phase claw pole type (refer to FIG. 2) with 96 steps is used for a 3.5 inch FDD. As described before, the stopped position of the rotor is shifted from the excited-stability point (in most cases the rotor stopped position is shifted from the excited-stability point), and hence at the moment when the excitation-hold is applied, the rotor is pulled into the excited-stability point and then stops (is held) taking a certain period of time (42.7 ms in the case shown) making in the meantime an exponential damping oscillation centering around the excited-stability point. Therefore, depending on the setting up of the excitation-hold time t1, it sometimes occurs that the hold time t1 is too short and, hence, the relative speed between the rotor and the stator does not become zero (the excitation hold is not completed). Even in such a case, the relative speed between the rotor and the stator attenuates exponentially with time as shown in FIG. 7 (the relative position between the rotor and the stator also attenuates exponentially). Hence, even when the relative speed of the rotor does not become zero, the practice is highly effective in stabilizing the starting up. Therefore, the invention shall not exclude the case where the relative speed between the rotor and the stator is not always brought to zero.

Figure 8:
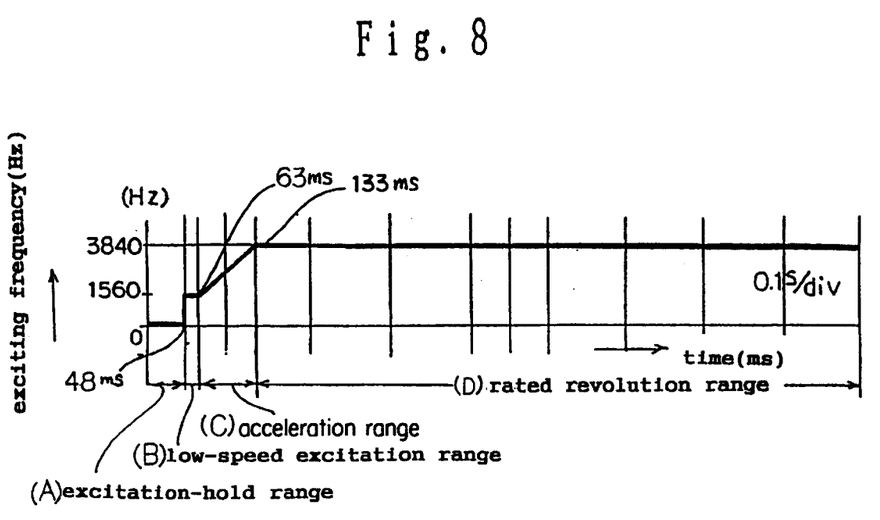
FIG. 8 is an example of the starting pattern of a stepping motor.
Figure 9A:
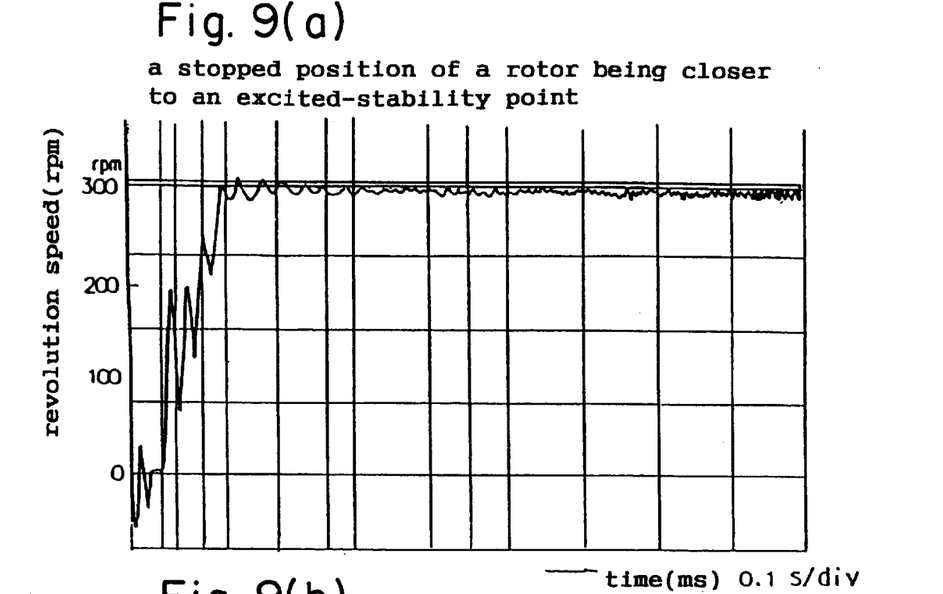
Figure 9B:
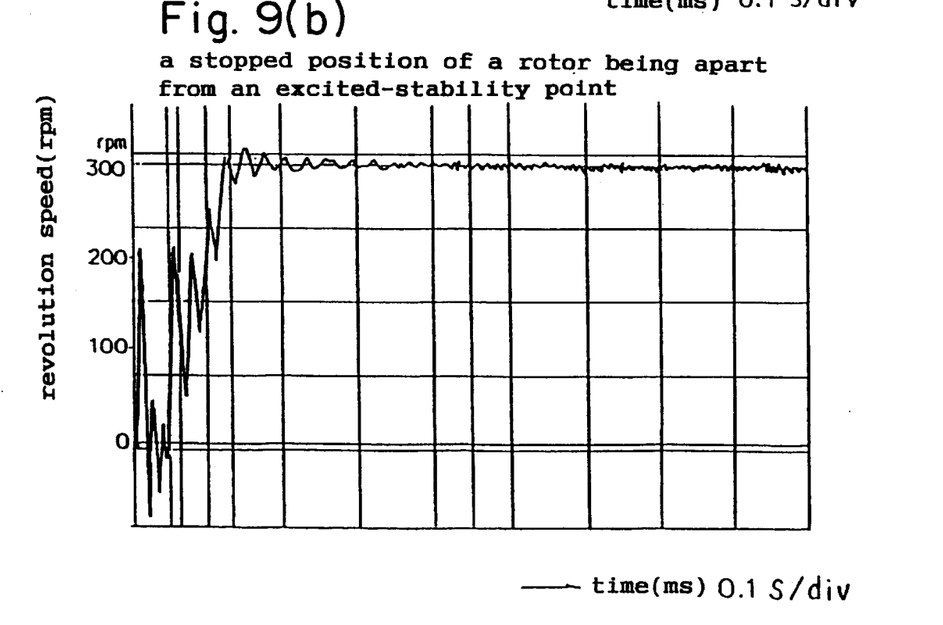

As concrete examples of starting characteristics, a starting pattern in the case where a stepping motor of a two-phase claw pole and inner rotor type with 96 steps was used for a 3.5-inch FDD is shown in FIG. 8 and variations in the number of revolutions of the recording disk with time observed at that time (waveforms indicating the conditions at the starting up) are shown in FIG. 9(a) and FIG. 9(b).

The starting pattern of FIG. 8 corresponds to the second embodiment, and this is the case where t1=48 ms, ta=15 ms, and t2=70 ms and f1=0 Hz, f2=1560 Hz, and f3=3840 Hz. The exciting frequency 3840 Hz corresponds to the rated number of revolutions 300 rpm of the recording disk and the exciting frequency 1560 Hz is about 40% of the rated revolution.

FIG. 9(a) shows variations in the number of revolutions of the rotor with time (starting characteristic) when the stopped position of the rotor was very close to the excited-stability point (its shift from the excited-stability point was about 1.5 degrees) and FIG. 9(b) shows variations in the number of revolutions of the rotor with time (starting characteristic) when, conversely, the stopped position of the rotor was far apart from the excited-stability point (its shift from the excited-stability point was a maximum value of about 7.1 degrees), respectively. It is known from FIG. 9(a) that, when the rotor was stopped very close to the excited-stability point, the rotor was subjected to the excitation-hold completely within a DC excitation-hold time t1=48 ms. While the time until a rotor is completely held by excitation depends on the motor characteristics and the initial shift from the excited-stability point, it was known as a result of experiments to be 50 ms or so at the maximum. It is shown in the diagram that a negative number of revolutions occurred at the instant of the excitation-hold. This indicates that the near-by excited-stability point of the rotor in its stopped state (at the instant when it was started) was located in the direction opposite to the revolution of the rotor. Therefore, the rotor was reversely rotated to come to be held at the excited-stability point.

It is known from FIG. 9(b) that, when the rotor was stopped far apart from the excited-stability point, complete holding of the rotor by excitation was not attainable within the DC excitation-hold time t1=48 ms. It is shown, in this case, that the DC excitation-hold time t1=48 ms is too short to completely hold the rotor portion by excitation. While it is shown in the diagram that a positive rotation occurred at the instant of the excitation-hold, this indicates that the near-by excited-stability point of the rotor in its stopped state was, contrary to the case of FIG. 9(a), located in the same direction as the rotation of the rotor. Therefore, the rotor was normally rotated to come to be held at the excited-stability point.

From the starting waveforms shown in FIG. 9(a) and FIG. 9(b), it is known that stable starting characteristics were equally obtained in conformity with the spirit of the invention. Incidentally, the standard of the revolution settling time for the FDD is 480 ms or below. The examples shown in FIG. 9(a) and FIG. 9(b) sufficiently meet the standard and it can be said that satisfactory functioning and meritorious effects of the invention are achieved thereby.

From the starting waveforms of FIG. 9(a) and FIG. 9(b), the characteristic frequency is found to be 60 to 66 Hz in the DC excitation-hold range, 56 Hz in the low-speed excitation range, 40 to 43 Hz in the accelerating excitation range, and 34.8 Hz in the rated revolution range. These values were virtually the same in both the cases of FIG. 9(a) and FIG. 9(b). Since stepping motors in general have a small damping factor, they produce a transient oscillation at the points where the excitation mode is changed. For example, in the excitation-hold range, an oscillation is produced at the excited-stability point at the beginning of the DC excitation-hold (refer to FIG. 7), and at the turn of the acceleration range to the rated revolution range, an oscillation is produced at the beginning of the rated revolution range centering around the synchronous speed determined by the exciting frequency. The phenomenon of oscillation is due to the characteristic oscillation and the value can be obtained also by calculation.

The phenomenon of oscillation can be approximated by a simple harmonic motion determined by the moment of inertia J (kg·m2) of the rotor portion and the restraining force K (N·m/rad) acting on the moment of inertia {The restraining force K is the value of the torque per unit angle. In short, the same is represented, in the excitation-hold period, by the maximum gradient T/θ (N·m/rad) of the Θ −T characteristic, and, in the synchronous operation period, by the maximum gradient Tmax(N·m/rad), where Tmax(N·m) is the value of the pull out torque} and expressed, using the position of the rotor Θ (rad) and time t (sec), by the following differential equation:

$$J \cdot (d^2\Theta/dt^2) = K \cdot \Theta M/4,$$

where M is the number of steps of the motor and the damping factor is assumed to be zero.

From the above equation, the characteristic frequency f0 (Hz) is given by $$f0 = 1/(2\pi) \cdot \sqrt{\{K \cdot (M/4)/J\}} \text{ (Hz)}.$$

While the above f0 is that obtained when the damping factor is neglected, if it is calculated with the damping factor taken into consideration, the value becomes smaller than the above value of f0. The coefficient M/4 in the above equation is that for converting the mechanical angle $\Theta$ (rad) into the electrical angle $\Theta$ (rad).

In the rated revolution range (300 rpm) of FIG. 9(a) and FIG. 9(b), using for numerical calculation the actually measured values of the pull out torque Tmax=102 (g·cm) and moment of inertia of the rotor portion including the recording disk J=45.6 (g/cm 2), and the number of steps N=96, the characteristic frequency f0 (Hz) is calculated as $$f0 = 1/(2\pi) \cdot \sqrt{\{102 \cdot 9.8 \cdot 96/(4*45.6)\} \cdot 10}$$

$$\approx 36.5 \text{(Hz)}.$$

This value virtually agrees with the actually measured value 34.8 (Hz). Thus, the characteristic frequency f0 can be simply obtained either by actual measurement or by calculation.

Referring to FIG. 9, relationship of the period T0 (1/f0) obtained from the inverse of the characteristic frequency f0 with the DC excitation-hold time t1 and low-speed excitation time ta in the starting pattern will be described. As mentioned above, the DC excitation-hold time t1 is equal to 48 (ms) in the cases of FIG. 9(a) and FIG. 9(b). This value corresponds to 2.87 to 3.16 times the period obtained from the actually measured characteristic frequency {60 to 66 (Hz)}.

On the other hand, the low-speed excitation time ta is 15 (ms) and this value corresponds to 0.84 time the period obtained from the actually measured characteristic frequency {56 (Hz)}.

Accordingly, the time T virtually equal to one period (or an integer multiple of the period) mentioned in this invention is the time T in the range given, with respect to the period T0 (1/f0) obtained from the characteristic frequency f0, by the following inequality:

$$nT0 + 0.85T0 \leq T \leq nT0 + 1.15T0,$$

where n is an integer greater than zero.

Figure 6:
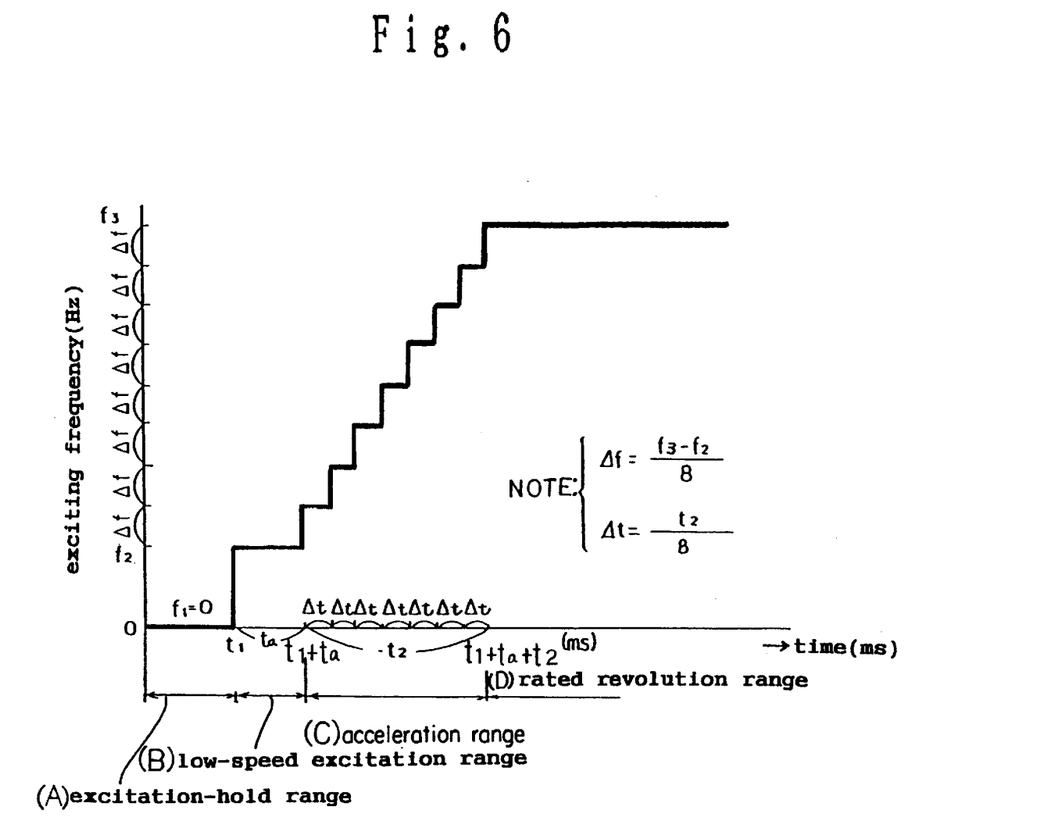
FIG. 6 is a third example of the starting pattern diagram when a stepping motor is started up.

Now, a third embodiment is shown in FIG. 6. This embodiment, similarly to the second embodiment, consists of four ranges: (A) excitation-hold range, (B) low-speed excitation range, (C) acceleration range, and (D) rated revolution range. The DC Q excitation-hold time t1 of the excitation-hold range and the time ta of the subsequent low-speed excitation range at the exciting m frequency f2 in the third embodiment are also similar to those in the second embodiment. However, in the subsequent acceleration range thereof, the exciting frequency is increased stepwise up to the exciting frequency f3{the pattern in this embodiment shown is such that it has equally divided eight steps, in which the width of the step of the frequency f=(f3−f2)/8 and the corresponding width of the time is $\Delta$ t=t2/8} and, then, synchronism is achieved in the rated revolution range at the exciting frequency f3.

In the DC excitation-hold time t1 at the beginning of the starting up, the same as in the first and second embodiments, the position of the rotor relative to the stator is pulled into the excitation-hold state, and then the rotor is stopped (where the relative speed between the rotor and the stator becomes zero). The subsequent low-speed excitation range is also the same as in the second embodiment.

However, circumstances in the following acceleration range of the recording disk are quite different. That is, in the first and second embodiments, the exciting frequency is gradually and continuously (linearly) increased but in the third embodiment it is increased stepwise. By accelerating it stepwise in the acceleration range, the exciting frequency can be generated simply and economically by the digital circuit processing technique. Accordingly, such merits can be obtained as to make the circuit smaller in scale and, further, to intentionally avoid the racing point peculiar to the step motor. As a matter of course, the number of steps in the acceleration range is not limited to that in the present embodiment (the steps in the third embodiment are equally divided eight steps) and, further, it is not necessary to make the widths of the steps equal. The essential thing is to establish a starting pattern with a small possible number of steps in such a way that the racing point peculiar to the motor is avoided and the settling time of the recording disk is shortened. Thus, a more economical starting circuit than the first and second embodiments can be constructed. In order to attain the "get used to" condition mentioned before with reference to the excitation time ta in the description of the second embodiment, it is, of course, preferred that the width of the step $\Delta$ t in the acceleration range be set to be virtually equal to one period determined by the characteristic frequency or an integer multiple of the period.

According to the present invention, in the use of economical stepping motors (specifically, two-phase claw-pole type stepping motors being effective) as spindle motors for information recording apparatuses such as FDD, it is made possible to avoid such fatal difficulty as the failure of start-up of the recording disk when it is started, and to secure a stable revolution settling time. As a result, the reliability of the apparatus can be greatly improved. Further, as compared with the conventional structure built by using a brushless DC motor, the present invention can greatly reduce the percentage of the cost of the spindle motor to the total cost of the apparatus.

What is claimed is:

1. A method for driving a recording disk for use in an information recording apparatus employing a stepping motor, having a rotor and a stator, for directly driving the recording disk of information at a constant speed, comprising the steps of:
    applying a DC excitation hold, so that the relative speed between the rotor and the stator is zero; and then
    gradually increasing a frequency of a driving signal applied to said stepping motor for driving the stepping motor in its stopped condition from a self-starting frequency to a desired frequency within a predetermined period of time.

2. A method for driving a recording disk for use in an information recording apparatus employing a stepping motor for directly driving the recording disk of information at a constant speed, comprising the step that DC excitation is applied to said stepping motor in its stopped condition at the beginning and then, a frequency of a driving signal is applied to said stepping motor for driving the stepping motor, and is gradually increased from a self-starting frequency to a desired frequency within a predetermined period of time.

3. The method according to claim 2, wherein the frequency produces a number of revolutions less than half of a rated revolution, and then the frequency is gradually increased to a value corresponding to the rated revolution, so that the rated revolution is attained within a fixed period of time.

4. The method according to claim 2, wherein a low frequency is continued for a predetermined period of time, and then the frequency is gradually increased to a value corresponding to a rated revolutions so that the rated revolution is attained within a fixed period of time.

5. The method according to claim 2, wherein the DC excitation is applied for a time which is virtually equal to one period of a natural frequency of a damping oscillation occurring at the time when the DC excitation is applied, or virtually equal to an integer multiple of the period.

6. The method according to claim 5, further comprising the step of selecting said motor to be a two-phase claw-pole type stepping motor.

7. The method according to claim 5, further comprising the step of selecting said information recording apparatus to be a floppy disk drive.

8. A method for driving a recording disk for use in an information recording apparatus employing a stepping motor, for directly driving the recording disk at a constant speed, comprising the steps of:

gradually increasing a DC excitation frequency of a driving signal applied to said stepping motor in its stopped condition from a self-starting frequency to a desired frequency within a predetermined period of time, wherein the DC excitation frequency is continued for a predetermined period of time, and then the frequency is gradually increased to a value corresponding to a rated revolution so that the rated revolution is attained within a fixed period of time, and wherein the DC excitation is applied in a low-speed excitation range for a time which is virtually equal to one period of a natural frequency of a damping oscillation occurring at a time when the low-speed excitation is applied, or virtually equal to an integer multiple of the period.

* * * * *

UNITED STATES PATENT AND TRADEMARK OFFICE
CERTIFICATE OF CORRECTION

PATENT NO.: 6,078,457
DATED    : June 20, 2000
INVENTOR(S): Yuzuru SUZUKI, et al.

It is certified that errors appear in the above-identified patent and that said Letters Patent is hereby corrected as shown below:

Col. 1, line 34, change "inertial" to --inertia--.

Col. 11, line 8, change "revolutions" to --revolution,--.

Signed and Sealed this

Twenty-fourth Day of April, 2001

*Attest:*

NICHOLAS P. GODICI

*Attesting Officer*    *Acting Director of the United States Patent and Trademark Office*